(12) United States Patent
Yang et al.

(10) Patent No.: US 7,571,173 B2
(45) Date of Patent: Aug. 4, 2009

(54) CROSS-PLATFORM TRANSPORTABLE DATABASE

(75) Inventors: Wanli Yang, San Mateo, CA (US);
Bipul Sinha, Foster City, CA (US);
Amit Ganesh, San Jose, CA (US); Wei Hu, Palo Alto, CA (US); Alok Pareek, Brisbane, CA (US); Alexander H. Hwang, Orinda, CA (US); Steven Charles Wertheimer, Kentfield, CA (US); Francisco M. Sanchez, San Carlos, CA (US); Dmitry Mikhailovich Potapov, Emerald Hills, CA (US);
Shen-Ban Meng, Sunnyvale, CA (US);
Juan R. Loaiza, Redwood City, CA (US); William H. Bridge, Alameda, CA (US); J. William Lee, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 336 days.

(21) Appl. No.: 10/966,961

(22) Filed: Oct. 15, 2004

(65) Prior Publication Data

US 2005/0256908 A1 Nov. 17, 2005

Related U.S. Application Data

(60) Provisional application No. 60/571,088, filed on May 14, 2004.

(51) Int. Cl.
*G06F 7/00* (2006.01)
(52) U.S. Cl. ..................................................... 707/101
(58) Field of Classification Search ........................ None
See application file for complete search history.

(56) References Cited

U.S. PATENT DOCUMENTS 5,222,235 A 6/1993 Hintz et al.

(Continued)

FOREIGN PATENT DOCUMENTS

EP 0 992 909 A2 4/2000

(Continued)

OTHER PUBLICATIONS

Swierk, Edward et al. "The Roma Personal Data Service" Oct. 2001. <http://www.hpl.hp.com/personal/Mary_Baker/publications/Roma-WMCSA2000.pdf>.*

(Continued)

*Primary Examiner*—Christian P Chace
*Assistant Examiner*—Christyann R Pulliam
(74) *Attorney, Agent, or Firm*—Hickman Palermo Truong & Becker LLP

(57) ABSTRACT

A method and apparatus for creating a target database on a target platform based on a source database on a source platform is provided. A target database is created on the target platform based on data, metadata (for example, data in the system tablespace and control files), and external objects (for example, password files and externally stored tables) comprised within the source database. Data and metadata stored in tablespaces of the source database are converted to the format compatible with the target platform. The conversion of the data and metadata may be performed either at the source database or the target database. Redo information and undo information of the source database are not copied from the source database to the target database. Certain files, e.g., a password files, and links to externally stored object may be recreated on the target database.

26 Claims, 10 Drawing Sheets

DBMS 110 ON TARGET PLATFORM 116

DBMS 120 ON TARGET PLATFORM 126

U.S. PATENT DOCUMENTS

| | | | |
|---|---|---|---|
| 5,278,978 A * | 1/1994 | Demers et al. | 707/101 |
| 5,396,623 A | 3/1995 | McCall et al. | |
| 5,454,101 A | 9/1995 | Mackay et al. | |
| 5,551,020 A | 8/1996 | Flax et al. | |
| 5,579,516 A | 11/1996 | Van Maren et al. | |
| 5,692,174 A | 11/1997 | Bireley et al. | |
| 5,758,345 A | 5/1998 | Wang | |
| 5,787,445 A | 7/1998 | Daberko | |
| 5,787,446 A | 7/1998 | Dang et al. | |
| 5,819,298 A | 10/1998 | Wong et al. | |
| 5,864,853 A * | 1/1999 | Kimura et al. | 707/10 |
| 5,870,746 A | 2/1999 | Knutson et al. | |
| 5,890,167 A | 3/1999 | Bridge, Jr. et al. | |
| 5,890,169 A | 3/1999 | Wong et al. | |
| 5,944,818 A * | 8/1999 | Baxter et al. | 712/244 |
| 5,991,753 A * | 11/1999 | Wilde | 707/2 |
| 6,035,379 A | 3/2000 | Raju et al. | |
| 6,035,412 A | 3/2000 | Tamer et al. | |
| 6,085,200 A * | 7/2000 | Hill et al. | 707/202 |
| 6,098,076 A * | 8/2000 | Rekieta et al. | 707/202 |
| 6,108,748 A * | 8/2000 | Ofek et al. | 711/112 |
| 6,151,608 A * | 11/2000 | Abrams | 707/204 |
| 6,249,786 B1 * | 6/2001 | Wadewitz | 707/6 |
| 6,272,503 B1 | 8/2001 | Bridge et al. | |
| 6,272,505 B1 | 8/2001 | De La Huerga | |
| 6,442,663 B1 * | 8/2002 | Sun et al. | 711/202 |
| 6,453,038 B1 * | 9/2002 | McFarlane et al. | 379/265.05 |
| 6,539,396 B1 * | 3/2003 | Bowman-Amuah | 707/103 R |
| 6,549,922 B1 | 4/2003 | Srivastava et al. | |
| 6,694,306 B1 * | 2/2004 | Nishizawa et al. | 707/3 |
| 6,785,673 B1 | 8/2004 | Fernandez et al. | |
| 6,978,282 B1 | 12/2005 | Dings et al. | |
| 6,993,657 B1 | 1/2006 | Renner et al. | |
| 7,058,958 B1 * | 6/2006 | Shutt et al. | 719/328 |
| 7,487,168 B2 * | 2/2009 | Rys et al. | 707/101 |
| 2002/0073019 A1 | 6/2002 | Deaton | |
| 2002/0073139 A1 | 6/2002 | Hawkins et al. | |
| 2002/0091702 A1 | 7/2002 | Mullins | |
| 2002/0116457 A1 | 8/2002 | Eshleman et al. | |
| 2002/0143733 A1 | 10/2002 | Mukkamalla et al. | |
| 2002/0156796 A1 * | 10/2002 | Hisamatsu et al. | 707/104.1 |
| 2002/0169745 A1 * | 11/2002 | Hotti et al. | 707/1 |
| 2003/0014523 A1 | 1/2003 | Teloh et al. | |
| 2003/0115439 A1 * | 6/2003 | Mahalingam et al. | 712/1 |
| 2003/0140055 A1 * | 7/2003 | Doney et al. | 707/101 |
| 2003/0172158 A1 | 9/2003 | Pillai et al. | |
| 2003/0208505 A1 | 11/2003 | Mullins et al. | |
| 2003/0212789 A1 | 11/2003 | Hamel et al. | |
| 2004/0024979 A1 | 2/2004 | Kaminsky et al. | |
| 2004/0034615 A1 | 2/2004 | Thomson et al. | |
| 2004/0034669 A1 | 2/2004 | Smith et al. | |
| 2004/0064487 A1 | 4/2004 | Nguyen et al. | |
| 2004/0068509 A1 | 4/2004 | Garden et al. | |
| 2004/0068696 A1 | 4/2004 | Seyrat et al. | |
| 2004/0073567 A1 * | 4/2004 | Pelon | 707/102 |
| 2004/0088297 A1 * | 5/2004 | Coates et al. | 707/10 |
| 2004/0091114 A1 * | 5/2004 | Carter et al. | 380/259 |
| 2004/0143791 A1 | 7/2004 | Ito et al. | |
| 2004/0153459 A1 * | 8/2004 | Whitten et al. | 707/10 |
| 2004/0182225 A1 | 9/2004 | Ellis et al. | |
| 2004/0268305 A1 | 12/2004 | Hogg et al. | |
| 2005/0015386 A1 | 1/2005 | Mortensen et al. | |
| 2005/0278289 A1 | 12/2005 | Gauweiler et al. | |
| 2005/0278616 A1 | 12/2005 | Eller | |
| 2006/0168513 A1 | 7/2006 | Coulson et al. | |
| 2007/0044012 A1 | 2/2007 | Suver et al. | |
| 2007/0129953 A1 * | 6/2007 | Cunningham et al. | 705/1 |
| 2008/0077606 A1 | 3/2008 | Fang et al. | |

FOREIGN PATENT DOCUMENTS

| | | |
|---|---|---|
| WO | WO 02/05116 A2 | 1/2002 |
| WO | WO 02/097676 A2 | 12/2002 |

OTHER PUBLICATIONS

Frank Naude, "Oracle FAQ: Glossary of Terms" Feb. 28, 2001, <http://web.archive.org/web/20010228061218/http://www.orafaq.com/glossary/faqglosr.htm>.*

Microsoft Corporation, "Migrating Your Access Database to Microsoft SQL Server 7.0", Feb. 1999, ☐☐<http://msdn.microsoft.com/archive/default.asp?url=/archive/en-us/dnarsql7/html/access2sql.asp>.*

Software Resources International, "Application Migration Services", Aug. 5, 2002, <http://www.softresint.com/pub/SPD/01-04-012.pdf>.*

Spalding Office Systems. "DocuWare Document Server Specifications", Sep. 2, 2003, <http://web.archive.org/web/20030902215629/http://www.spaldingoffice.com/includes/static-documents/site/docuData/docservspec.html>.*

International Preliminary Examining Authority, "Notification of Transmittal of International Preliminary Report on Patentability," PCT/US2004/025805, dated Nov. 18, 2005, 16 pages.

The State Intellectual Property Office of P.R.C., "Notification of the Second Office Action", foreign application No. 200480023059.7, dated Aug. 22, 2008, 4 pages.

Claims, foreign application No. 200480023059.7, 5 pages.

Wickremesinghe et al., Distributed computing with load-managed active storage, Jul. 23-26, 2002, IEEE, pp. 13-23.

Veiga, et al., Complete distributed garbage collection: an experience with Rotor, vol. 150, No. 5, Oct. 27, 2003, pp. 283-290.

Schindler et al., Lachesis: robust database storage management based on device-specific performance characteristics, Proceedings of the $29^{th}$ VLDB Conference, Sep. 2003, ACM, pp. 706-717.

* cited by examiner

CROSS-PLATFORM TRANSPORTABLE DATABASE

CROSS-REFERENCE TO RELATED APPLICATIONS AND CLAIM OF PRIORITY

This application claims benefit of Provisional Application No. 60/571,088, entitled "Cross Platform Transportable Tablespaces" filed May 14, 2004 by Wei Hu, et al., the entire contents of which are hereby incorporated by reference as if fully set forth herein, under 35 U.S.C. §119(e).

The present application is related to U.S. application Ser. No. 08/865,693, entitled "Tablespace-Relative Database Pointers", filed on May 30, 1997 by William H. Bridge, Jr., et al., now U.S. Pat. No. 6,272,503 issued on Aug. 7, 2001, the contents of which are herein incorporated by reference.

The present application is related to U.S. application Ser. No. 09/675,195, entitled "Using Transportable Tablespaces for Hosting Data of Multiple Users", filed on Sep. 29, 2000, by Juan R. Loaiza, et al., now U.S. Pat. No. 6,549,901 issued on Apr. 15, 2003, the contents of which are herein incorporated by reference.

The present application is related to U.S. application Ser. No. 08/852,968, entitled "Pluggable Tablespaces", filed on May 8, 1997, by William H. Bridge Jr., et al., now U.S. Pat. No. 5,890,167 issued Mar. 30, 1999, the contents of which are herein incorporated by reference.

The present application is related to U.S. application Ser. No. 10/966,679, entitled "Cross Platform Transportable Tablespaces," filed on Oct. 14, 2004, by Wei Hu, et al., the contents of which are herein incorporated by reference.

FIELD OF THE INVENTION

The invention is generally related to the field of transferring data, and more specifically related to the field of transporting information from one database on a first platform to another database on a second platform.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, unless otherwise indicated, it should not be assumed that a problem has been recognized by the prior art merely because the problem is discussed in this section.

The ability to store and retrieve large amounts of data is one of the most important functions of computers in today's society. To carry out these functions, database systems are typically used to retrieve and store data in databases. Database systems have performed these functions very successfully, creating for society the ability to retrieve data at speeds and quantities previously unimagined, and bestowing onto society an unprecedented level of access to information. The success of database systems has unleashed an insatiable demand for even faster and more efficient database systems that process even greater quantities of data.

It is often desirable to transport (or move) a database from one platform to another. As used herein, the term 'platform' refers to a computer system running a particular database product version and operating system product. A computer running Oracle's 10 g database server product for UNIX is a different platform than a computer running Oracle's 10 g database server product for Windows NT. An Oracle 10 g tablespace created on UNIX would have a different on-disk format than the same tablespace created on Windows NT.

With the emergence and maturity of new platforms, many database operators wish to transport an existing database to a new platform. Also, it may be desirable to transport a database to a lower cost platform, or to a new platform for purposes of replication, instantiation, and/or migration.

According to one approach for transporting a database from a source platform to a target platform, a new database is created on the target platform, and the new database is populated with data from the source database. To populate the new database with data from the source database, utilities such as export/import or datapump are used. A conventional technique for implementing the export/import operations is the command generation technique. Under the command generation technique, an "exporting" database system generates a file of insert commands. The insert commands conform to a database language, such as the structured query language ("SQL"). For each record being exported, an insert command specifies the creation of a record with the values needed to generate a copy of the record being exported. To import the data, an "importing" database system, which is capable of executing commands written in the database language, scans the file, executing each insert command.

However, export/import or datapump operations are very slow since they need to process the data one row-at-a-time. Executing an insert command for each record being exported is typically a slow process, which may span days for larger databases as a result of processing the data one row-at-a-time. While data is being exported, access to the data is restricted, and users may need to tolerate a lengthy downtime. Consequently, the database user, who requires access to the data, may be significantly impacted while data is being exported. Similarly, data dump operations also rely on processing the data logically one row-at-a-time. In some cases, export/import and data dump operations are too slow to meet user needs, and the associated traditional export and/or dump files require a large amount of storage space. Thus, conventional techniques for exporting data may be significantly burdensome.

Another approach for moving data from a source database to a target database involves the use of transportable tablespaces. A tablespace is a logical collection of database objects that reside in physical storage containers (e.g., data files). Database objects are objects managed by a database system. Transportable tablespaces are tablespaces that can be copied and integrated into another database system, or in other words, attached (e.g., "plugged in") to the other database system. Transportable tablespaces are described in U.S. Pat. No. 6,549,901. With respect to a tablespace, database, and database server, the term "attach" refers to configuring a database and/or database server so that the database objects in the tablespace are incorporated within the database and the tablespace is used to store data for the database.

In contrast to repopulating the data at the row level, configuring a database to attach a tablespace involves (1) modifying database metadata so that the tablespace and database objects associated with the tablespace are defined to be part of the database and (2) incorporating storage containers into the database for holding the database objects. The database metadata may be altered using a variety of techniques involving automated steps and/or manual steps performed by a Database Administrator (DBA). The DBA can run utilities available on the source database system that may be executed to export the metadata into a "metadata dump file", and run utilities on the target database system to construct metadata from the metadata dump file. Alternatively, metadata can be included with the data being transported in the tablespace, and the target database can reconstruct the metadata from the metadata included in the tablespace. The DBA can also manually reconstruct the metadata on the target database system. Using the process of attaching tablespaces allows data to be copied using operating system utilities for copying files, which copy the physical bits and run much faster than the process of extracting and loading data by executing queries and insert statements.

However, while the approach of transportable tablespaces advantageously increases the speed and ease of transferring data from a source database to a target database, transportable tablespaces cannot be used to transfer the entire contents of a source database to a target database because transportable tablespaces cannot transfer certain types of metadata (such as undo information and redo information) stored in the database. For example, system tablespaces cannot be transported from a source database to a target database using transportable tablespaces because certain types of metadata (such as the SYSTEM rollback segment) cannot be transferred using transportable tablespaces.

In view of the foregoing, there is a need for a more efficient approach for transferring information in a database on a source platform to a database on a target platform.

BRIEF DESCRIPTION OF THE DRAWINGS

Embodiments of the invention described herein are illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

An approach for transporting a database from a source platform to a target platform is presented. As used herein, to "transport" a source database, located on a source platform, means to create a target database, on a different platform than the source platform, which contains data and metadata of the source database.

A target database is created on the target platform based on data and metadata (for example, data in the system tablespace and control files) comprised within the source database. In creating the target database, data and metadata stored in tablespaces will be converted to the format compatible with the target platform. The conversion of the data and metadata may be performed either at the source database or the target database. The conversion of data and metadata may also include changing the endian order of the data and metadata.

During the conversion, a user may be prompted to supply data values, valid on the target platform, that are associated with converted data or metadata. Possible data values of converted data and metadata, which are valid on the target platform, may also be automatically generated. The user may be prompted to accept or reject the possible data values associated with the converted data and metadata.

Some information contained within the source database may not be copied to the target database. For example, redo information of the source database may not copied from the source database to the target database because the change vectors in redo logs cannot be converted. Undo information of the source database also may not be copied to the target database because the change vectors in the undo record cannot be converted. During the transport operation, some information in the source database may be presented to the user to allow the user to verify that the information should be copied to the target database. Additionally, certain files, e.g., password files, and links to externally stored objects, may be recreated on the target database.

Advantageously, embodiments of the invention provide transporting data and metadata of a source database to a target database, even if the source database and target database are implemented on different platforms, without using database instructions, such as SQL commands, to read and write data. Thus, a database may be copied from one platform to another in a fast and efficient manner.

Architecture Overview

Figure 1:
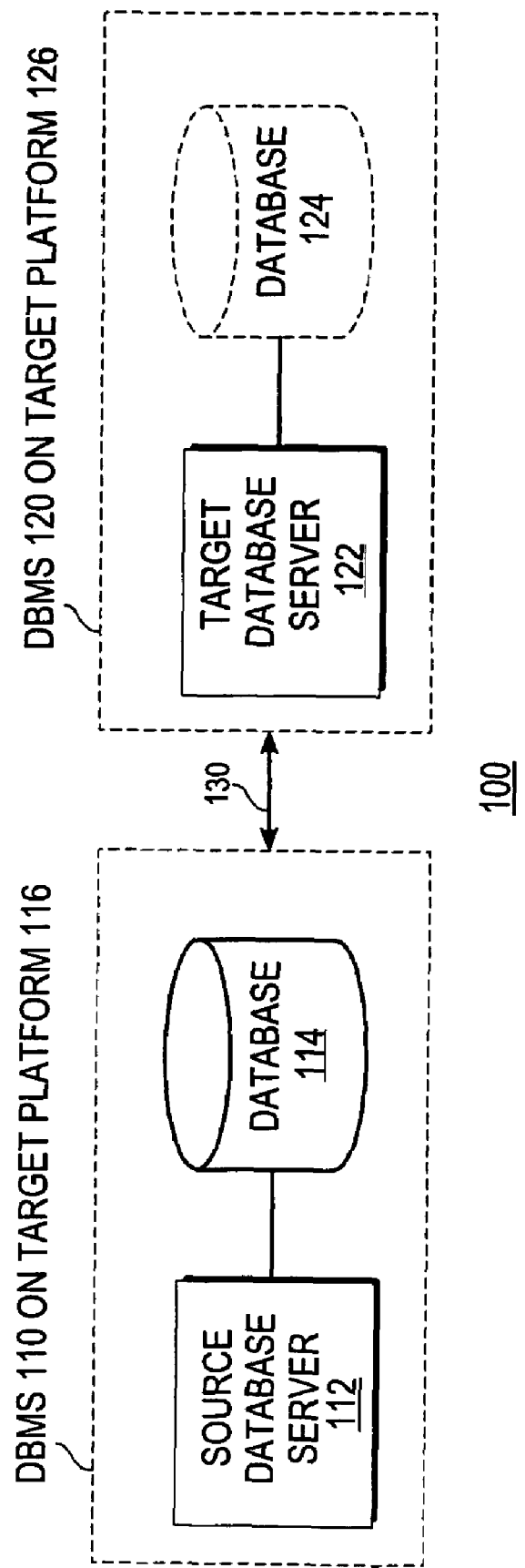
FIG. 1 is a block diagram of a system according to an embodiment.

FIG. 1 is a block diagram of a system 100 according to an embodiment. System 100 may be employed to copy a database from one platform to another platform. System 100 includes a first database management system ("DBMS") 110, a second DBMS 120, and a communications link 130.

DBMS 110 and 120 each comprise a database server and a database. A database server, such as database servers 112 and 122, refer to any functional component that is capable of servicing requests to retrieve or store data in a database. For ease of explanation, database 112 has been labeled source database server 112, and database 122 has been labeled target database server 122, as an illustrative example shall be discussed below wherein data and metadata are copied from database 122 to database 124.

DBMS 110 and DBMS 120 are each implemented on a platform. For ease of explanation, the platform which DBMS 110 is implemented on shall be referred to as the source platform 116, and the platform which DBMS 120 is implemented on shall be referred to as the target platform 126.

A database, such as databases 114 and 124, refers to any persistent storage capable of persistently storing data. Illustrative, non-limiting examples of a database include a relational database, an object-oriented database, and a multi-dimensional database.

Figure 2A:
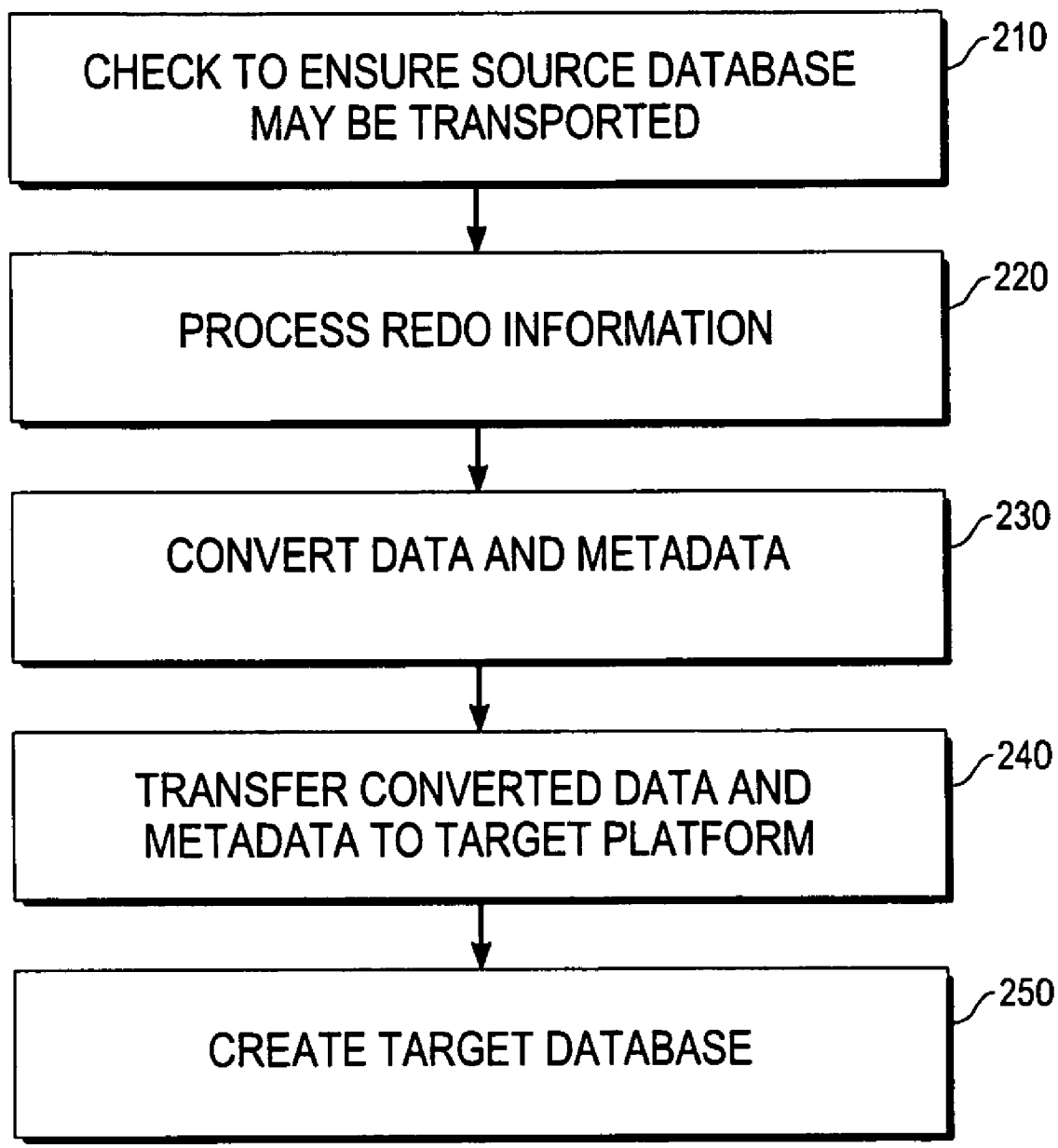
FIG. 2A is a flowchart illustrating the steps of creating a target database on a target platform containing the data and metadata of a source database on a source platform according to a first embodiment
Figure 2B:
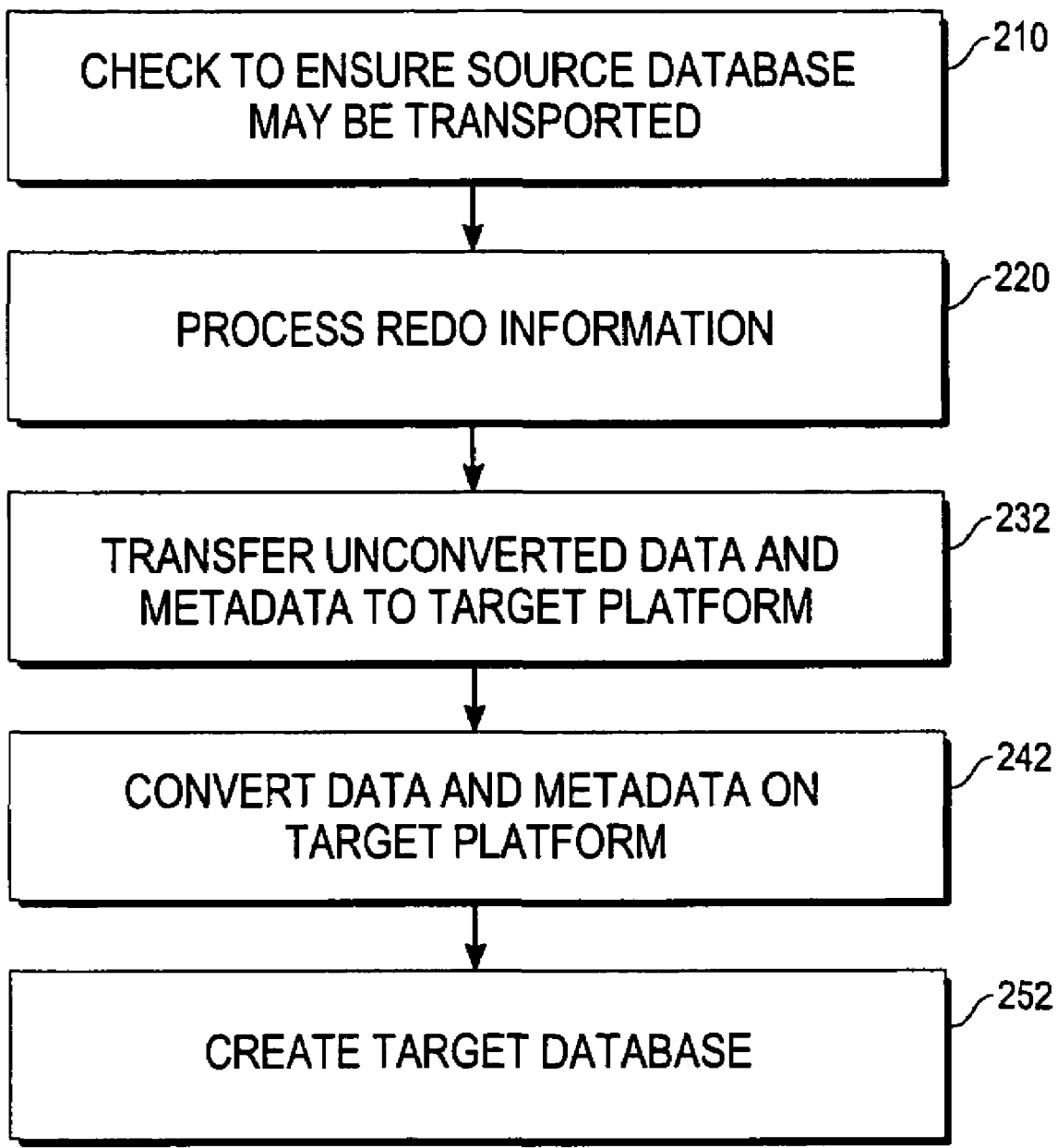
FIG. 2B is a flowchart illustrating the steps of creating a target database on a target platform containing the data and metadata of a source database on a source platform according to a second embodiment.

As embodiments of the invention shall be discussed wherein data and metadata are copied from database 114 to database 124, for ease of explanation, database 114 shall be referred to as the source database 114, and database 124 shall be referred to as the target database 124. Target database 124 is depicted in a dotted line in FIG. 1 because, as the creation of target database 124 is a result of the performance of step 250 as illustrated in FIG. 2A or FIG. 2B, target database 124 has not been instantiated (created) yet until after the performance of step 250 of FIG. 2A or FIG. 2B.

Communications link 130 may be implemented by any medium or mechanism that provides for the exchange of data between DBMS 110 and DBMS 120. Examples of communications link 130 include, without limitation, a network such as a Local Area Network (LAN), Wide Area Network (WAN), Ethernet or the Internet, or one or more terrestrial, satellite or wireless links.

While each of the components discussed above is depicted separately in FIG. 1, one or more of the above functional components may be implemented on the same computer system. For example, source database server 112 and target server database 122 may be implemented on the same machine in an embodiment.

Transporting a Database from One Platform to Another

The steps of transporting a target database from one platform to another are described below with reference to FIG. 2A, which is a flowchart illustrating the steps 200 of creating a target database on a target platform containing the data and metadata of a source database on a source platform according to an embodiment.

The steps illustrated in FIG. 2A may be initiated by a variety of sources. For example, a user associated with a client (not depicted in FIG. 1) may issue a request to database server 112 or database server 122 to perform one or more steps of FIG. 2A. Alternately, one or more steps of FIG. 2A may be performed by an automated program or process configured to perform the one or more steps. Thus, it shall be understood to those in the art that the steps of FIG. 2A may be initiated by any entity, e.g., a user associated with a client external to a DBMS or an automated program or process.

Determining Whether Source Database May be Transported

In step 210, a check is made to ensure that source database 114 may be transported to the target platform 126. Database server 112 or database server 122 may perform step 210.

A source database may not be able to be transported to the target platform 126 for a variety of reasons, including (a) source database 114 has active transactions that have not committed, and (b) source platform 116 is incompatible with target platform 126. Note that embodiments of the invention are able to transport a database from a source platform 116 to a target platform 126 whether or not the target platform stores data in a different endian format than the source platform. Consequently, the endian format employed by the target platform is not, in and of itself, a reason why a source database cannot be transported to the target platform. The process of converting data and metadata from one endian order to another is discussed in further detail below.

If source database 114 cannot be transported to the target platform 126, then a user may be notified. For example, if source database 114 cannot be transported to the target platform 126, then the entity performing step 210 (such as source database server 112) may notify a database administrator that requested that source database 114 be transported that source database 114 cannot be transported to the target platform 126.

In an embodiment, the steps of FIG. 2A may be performed in a different order than the order depicted in FIG. 2A. For example, in an embodiment, step 210 may be after the performance of step 220. Consequently, the order in which the steps of FIG. 2A (or FIG. 2B, explained in further detail below) are performed is merely illustrative of one embodiment, and other embodiments may perform the steps in a different order. If the source database 114 can be transported to the target platform 126, then processing proceeds to step 220.

Removing Reference to Redo Information

In step 220, redo information at source database 114 is processed so that reference to the redo information will be omitted from target database 124 once target database 124 is created. Database server 112 may perform step 220.

In an embodiment, step 220 may be performed by performing a clean shutdown of source database 114 to quiesce source database 114, and then opening source database 114 in a read-only mode. A primary function of redo log files is to record all changes made to data to allow recovery of a database should a failure prevent modified data from being permanently written to the database. After such a failure, the changes may be obtained from the redo long and reapplied to the database. Since no changes can be made to source database 114 after source database 114 is opened in read-only mode, reference to the contents of all redo log files on source database 114 may be safely omitted once target database 124 is created. After the performance of step 220, processing proceeds to step 230.

Converting Data and Metadata of Source Database

In step 230, data and metadata stored in source database 114 are converted to a format compatible with target platform 126. Note that the conversion of data and metadata stored in source database 114 may be performed on either source platform 116 or the target platform 126. For ease of explanation, the performance of step 230 of FIG. 2A shall be described below with reference to the conversion being performed on the source platform 116. However, an alternate embodiment shall be described hereafter with reference to a method 260 illustrated in FIG. 2B wherein the conversion of the data and metadata of source database 114 is performed on target platform 126.

The performance of step 230 of an embodiment shall be described in detail below with reference to FIG. 8, which is a flowchart illustrating the functional steps of converting data and metadata according to an embodiment. Generally, in step 810, reference to undo information stored in the source database 114 is removed. In step 820, data stored in tablespaces of source database 114 is converted into a format valid in the target platform 126. In step 830, metadata stored in the source database 114 is converted into a format valid in the target platform 126. Each of the functional steps of FIG. 8 shall now be described in greater detail below.

Removing Reference to Undo Information

In step 810, undo information stored in source database 114 is processed so that reference to the undo information in source database 114 will be omitted when data and metadata in source database 114 are copied to target database 124. Database server 112 or conversion tool 705 may perform step 230.

In an embodiment, database server 112 scans source database 114 to locate undo information stored within source database 114. Database server 112 thereafter modifies the undo information so that the undo information cannot be applied to the target database when tablespaces are copied from source database 114 to target database 124.

The performance of step 810 shall be described in greater detail below with reference to FIGS. 3-5. In an embodiment, undo information is written by source database server 112 into undo segments in source database 114. There may be many undo segments in source database 114. Each undo segment has a transaction table. Each transaction table has many slots. Each slot of a transaction table may be used by a transaction to store information about the transaction.

Figure 3:
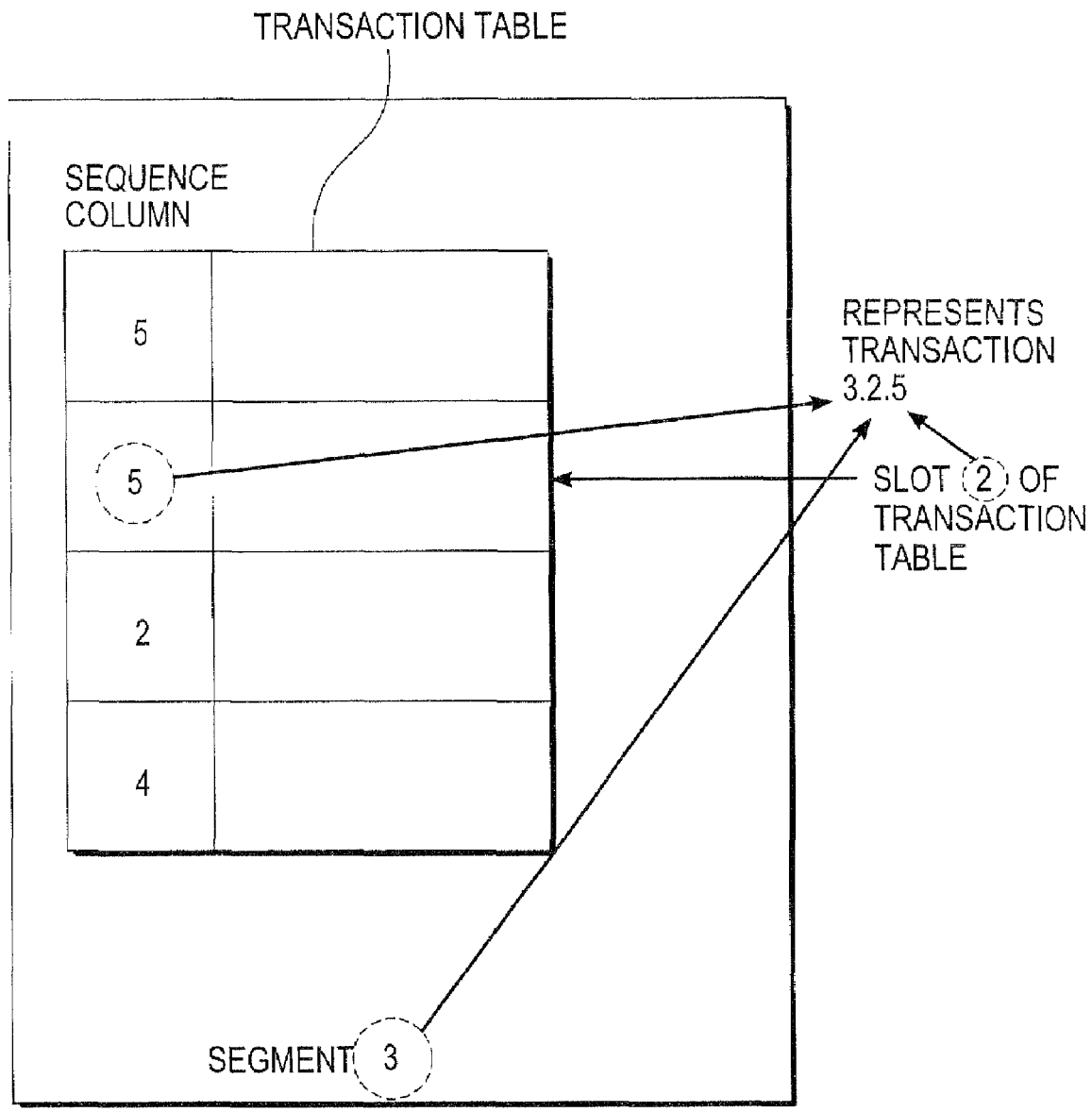
FIG. 3 is an illustration of a transaction table according to an embodiment.
Figure 4:
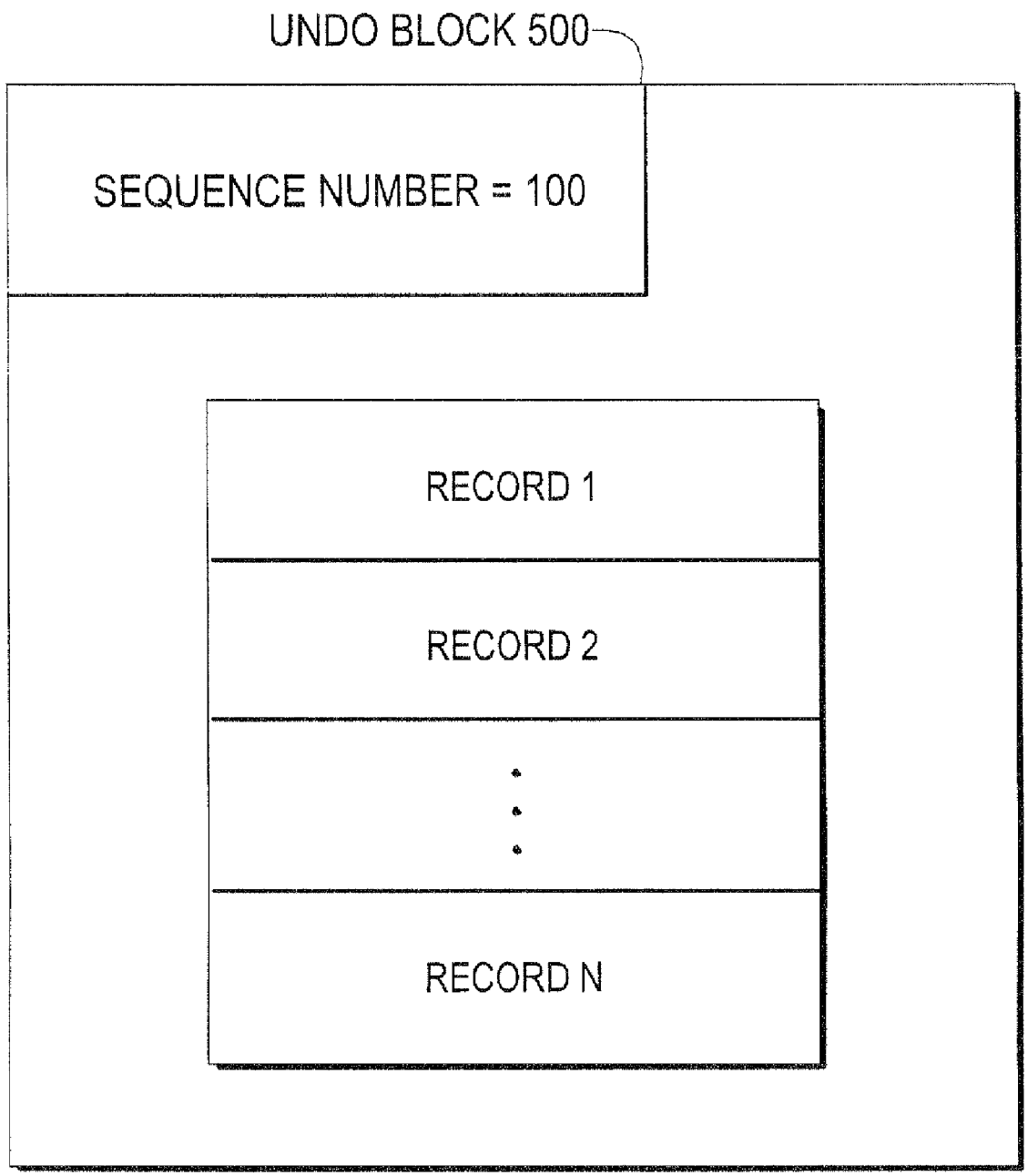
FIG. 4 is an illustration of an undo block in source database according to an embodiment.

FIG. 3 is an illustration of a transaction table according to an embodiment. As shown in FIG. 3, there is a sequence column in the transaction table. When a transaction is initiated in source database 114 by source database server 112, source database server 112 selects a slot in one of the transaction tables and increments a sequence number associated with that slot. Each slot of the transaction table of FIG. 3 is visually depicted as a row.

The undo segment number, the slot number, and the sequence number compose the transaction id for the transaction. For example, slot 2 of the transaction table in undo segment 3, has a sequence number of 5. This slot stores information for transaction id number 3.2.5.

Since source database server 112 increments a sequence number associated with a slot when initiating a new transaction, transaction ids that correspond to sequence numbers less than a particular transaction id are guaranteed to have committed. For example, transaction id 3.2.4 has committed because the sequence number in slot 2 of the transaction table in undo segment 3 has been incremented.

Databases store information in an undo block that allows the database to rollback a transaction, if necessary. FIG. 4 is an illustration of an undo block in source database 114 according to an embodiment. Transactions write undo records in undo blocks. An undo block can store several undo records. There is a sequence number in each undo block. When an undo block is reused by source database server 112, the sequence number is incremented.

An undo record may be identified by the undo block address, the sequence number of the undo block, and the undo record number.

The set of information written into the data block may include the transaction id, and which undo record may be used to undo the changes made to the data block by the transaction.

A database server may roll back changes made to one or more data blocks using undo information stored in undo blocks. However, after data and metadata stored in source database 114 is copied to target database 124, target database server 122 will not be able to properly interpret the undo information on target platform 126. As a result, it is advantageous to avoid copying undo information after a database is transported.

Undo information stored at source database 114 is modified so that the undo information will not be used by the target database 124 after tablespaces are copied from source database 114 to target database 124. One way to perform this step is to increment the sequence number stored in undo blocks and transaction tables.

Figure 5:
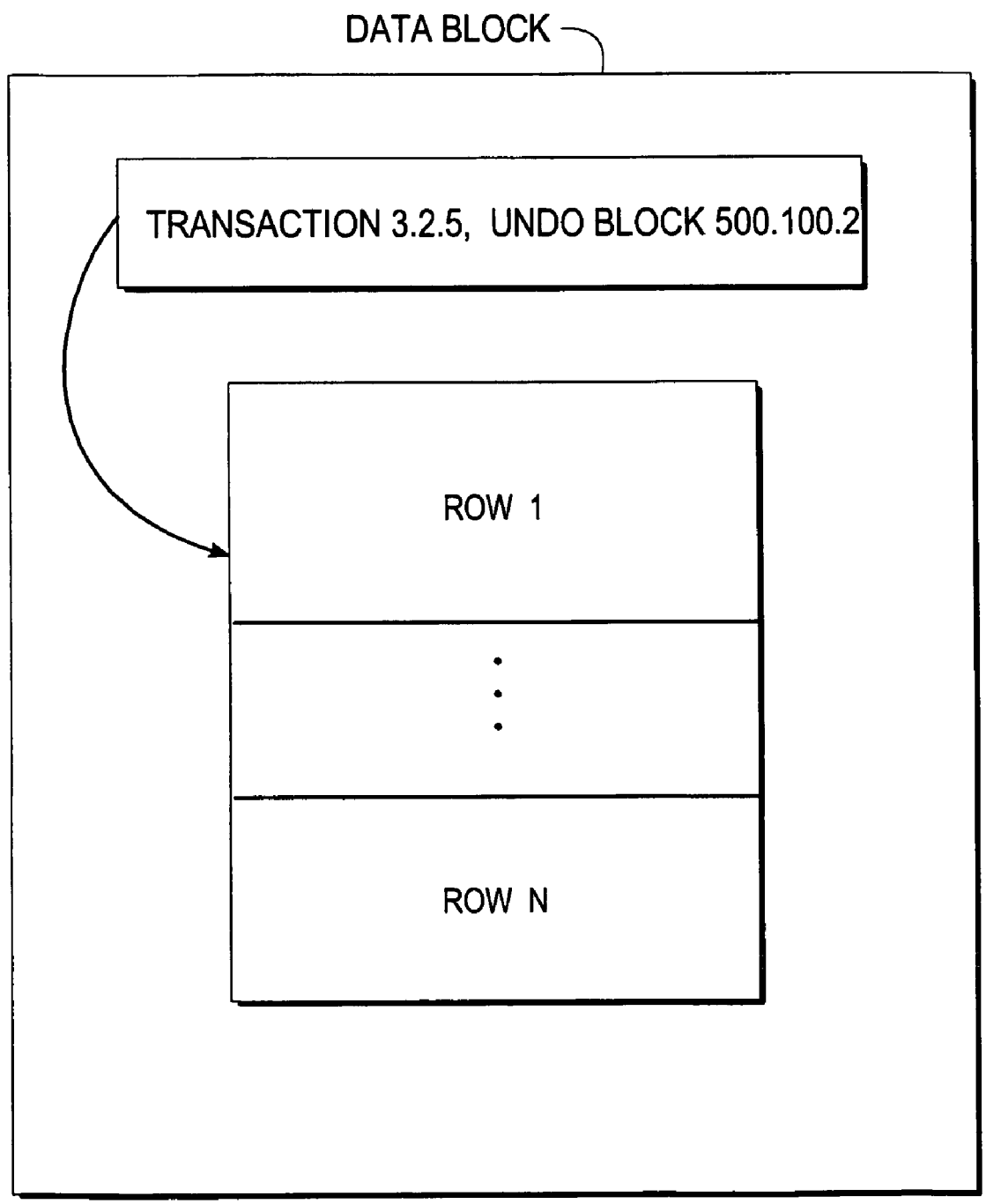
FIG. 5 is an illustration of a data block in source database according to an embodiment.

For example, the data block of FIG. 5 shows that in order to perform a rollback operation to the prior version of the datablock, undo record 500.100.2 written by transaction 3.2.5 needs to be applied. However, assume the sequence number of the undo block has been incremented to 101. When target database server 122 reads undo block 500, it will appear to database server 122 as if the undo block has been reused, and no longer contains undo information for transaction 3.2.5. Consequently, database server 122 will not attempt to access undo record 2 in the undo block since it appears to have been reused.

Similarly, assume the sequence number of slot 2 of undo segment 3 is incremented from 5 to 6. Thus, when database server 122 examines the transaction table, it will appear to database server 122 that the information about transaction 3.2.5 has been overwritten, and therefore, database server 122 will not attempt to rollback transaction 3.2.5 by applying its corresponding undo records.

Consequently, undo information stored at source database 114 may be modified by incrementing the sequence number stored in undo blocks and transaction tables. This ensures that the undo information will not be used by the target database 124 when tablespaces are copied from source database 114 to target database 124. After the performance of step 810, processing proceeds to step 820.

Converting Stored Data in a Tablespace into a Common Format

Figure 8:
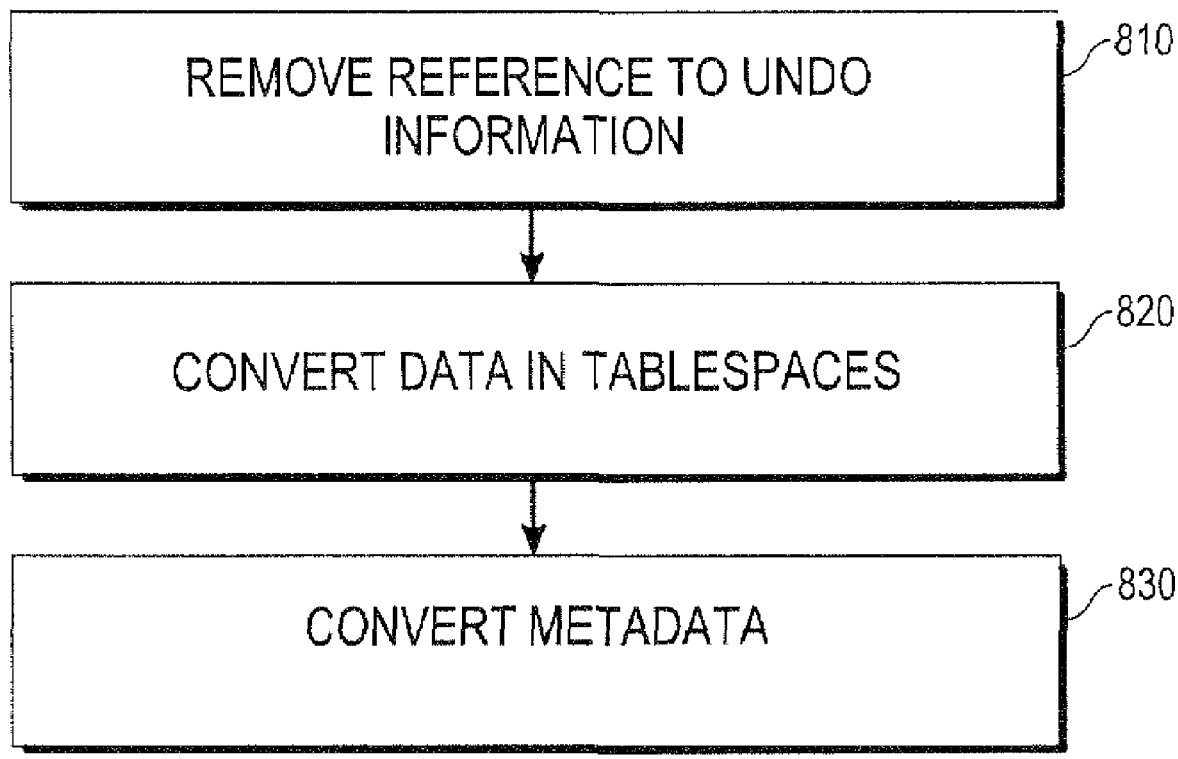
FIG. 8 is a flowchart illustrating the functional steps of converting data and metadata according to an embodiment.

Also in step 230, step 820 of FIG. 8 is performed in an embodiment. In step 820, data stored in tablespaces of source database 114 is converted into a format valid on target platform 126. In an embodiment, the format of stored data in each tablespace within source database 114 is converted into a common format, e.g., a format that is universal in that the common format is not machine dependent.

Approaches are described below for cross-platform transportation of tablespaces, in which tablespaces are transported between database systems that use different on-disk formats for the same or corresponding on-disk data. The on-disk data includes user data and metadata. It is efficient and desirable to use identical formats for user data on different platforms. It is not efficient and very undesirable to use the same formats for meta-data, because of performance, code complexity and other reasons. This makes database files on different platforms incompatible, and requires database file conversion when a file is moved across platforms.

To get the source on-disk format to look like the target on-disk format, a conversion operation is required. In an embodiment, a data block may contain a mixture of platform-specific and platform-neutral data elements. Only the platform-specific elements are converted. In an embodiment each row may contain platform-specific representations. In another embodiment, only the metadata in the data block is in a platform-specific format. As an optional optimization, where possible all headers are kept in a common format so that the number of elements that need to be converted is reduced.

Additionally, in an embodiment, a database system uses a common format that provides a common structure and structural layout but does not necessarily provide a common endian ordering for on-disk data structures. In this embodiment, a conversion operation may still be required to address endian ordering. By providing common structural layout, the common format reduces code complexity by simplifying conversion algorithms to handle endian ordering only.

Additionally, by using a common format, each platform is only required to understand two formats (its own native format and the new common format) instead of each platform being required to recognize all other platform formats. The other on-disk formats (i.e. besides the common format) are referred to herein as native (or platform-specific) on-disk formats. The on-disk data structures formatted according to a native on-disk format can be converted into the common format. The common format allows, but does not require, the on-disk data structures converted from the native on-disk format to the common format to be capable of being converted back from the common format to the original native on-disk format. In other words, in an embodiment, in addition to files from other formats being converted into the common format, the on-disk data structures may also be converted back to any original format without loss of features, functions, or information associated with the format into which the file is being converted.

In the approaches described for cross-platform transportation of tablespaces, a tablespace is transported from the source database system to a target database system that uses a common on-disk format. The on-disk data structures in the tablespace may be converted from the source on-disk data format to the common format before being attached to the target database system.

On-Disk Data Structures

On-disk data structures include data structures that are used to hold user data and metadata. User data is the data that is stored and managed on behalf of end-users. On-disk structure metadata is data that describes the on-disk data structures. On-disk structure metadata may also include on-disk data structures. Examples of on-disk data structures include an operating system file, a data block, a time stamp, and pointer offsets. A data block is an atomic unit of storage space allocated to store one or more database records (e.g., rows). Typically, a database system is configured to read and write database records from persistent storage and volatile memory in units no smaller than data blocks. A file formatted according to one on-disk format may have a file header. According to an embodiment, a header is one of the initial data blocks in a file. File headers on different platforms may have different attributes. For example, one platform can have an offset N that must be skipped before accessing the actual data that is considered relevant. On another platform the offset may be 0 or another number different than N.

Data blocks may also have headers. A data block header for one on-disk format may include attributes not included in the data block header of another on-disk format, or may include attributes that correspond to an attribute in another on-disk format but that are not used by or may have a different data type than the corresponding attribute in the other on-disk format.

In an embodiment, transportable tablespaces may be converted relatively quickly, because only the per-block metadata is converted and not the row data itself. In this embodiment, the row data is already in a common format that is endian-ness neutral. In an endian-ness neutral format, the same endian format is always chosen to represent the same data regardless of the endian-ness of the system. In an endian-ness neutral format the data will always be interpreted in the endian-ness that the data was written. In an embodiment, only the metadata in the block is in platform-specific format. Consequently, in this embodiment, block-at-a-time processing may be performed. In an embodiment a block may contain a mixture of platform-specific and platform-neutral data structures, and only the platform-specific structures are converted. In an alternative embodiment, each row may include some non-platform specific data, and the table space may be processed on a row-by-row basis. In an embodiment, the amount of row-by-row processing necessary may be relatively small.

Some on-disk data structures that reside on different operating system platforms may have on-disk formats with identical attributes and data types. However, different operating systems may use different ways of representing data types. On-disk formats for different operating systems may include an offset pointer represented by a pointer typed as a double byte integer. The on-disk format for one operating system may use a large endian notation to represent the integer, while the on-disk format for another operating system may use a small endian notation to represent the same integer data type.

As an example of the common structure and according to approaches for cross-platform transportation of table spaces described herein, the tablespaces of a source database are converted from the source on-disk data structure to the common data structure, unattached, converted at the source or target database, and finally attached to a target database system. The conversion may be performed at either the source database system or target database system, for example.

In an embodiment, the cross platform transportation of tablespaces allows the transport to be performed at a logical level and thereby facilitates preserving the data integrity while transporting the table spaces. In an embodiment, the cross platform transportation of tablespaces allows the movement of tablespaces among computers of different hardware and/or software architectures, running different database system products or product versions and having different on-disk data structures. Consequently, in an embodiment, when a user wants to move databases to lower cost platforms, the user may no longer be faced with a lengthy downtime by using cross-platform transportable tablespaces.

In an embodiment, structural differences are removed, and therefore conversions of the structures between platforms are not required. Only the representations need to be converted. Accordingly, conversions between platforms may be performed at speeds that are an order of magnitude faster.

In an embodiment, row data are kept essentially platform-independent and thus row level conversion is not usually required.

In an embodiment, high performance parallel algorithms are used to process conversions. For example, in an embodiment, row level processing is necessary only (1) if the row length of the row level meta data longer than a particular length (e.g., 253 bytes), the length needs to be shortened, and/or (2) if data or new data types are introduced that are not platform-independent. In an alternative embodiment, no row level processing is necessary.

An Embodiment of a Method for Transporting Tablespaces Across Platforms

Figure 6:
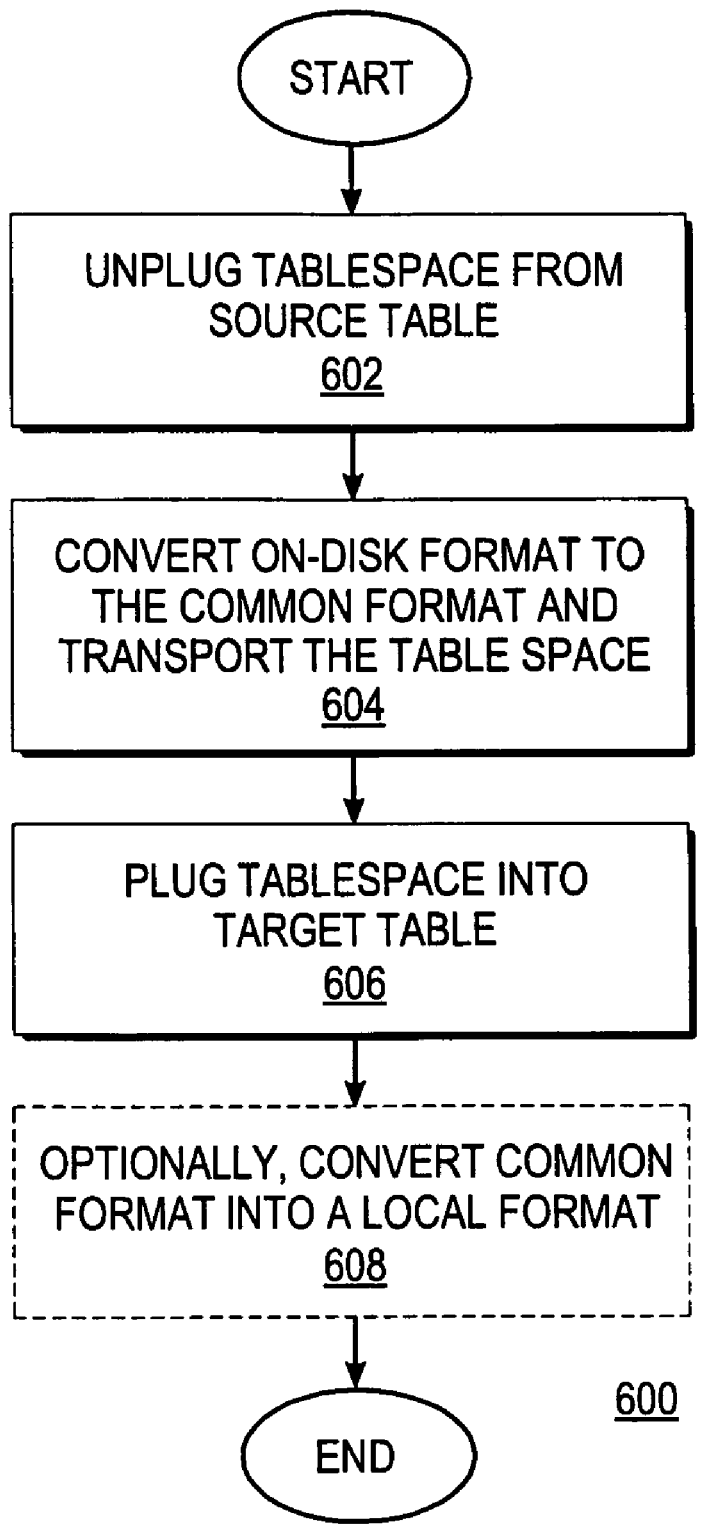
FIG. 6 shows a flowchart of a method for transporting tablespaces across platforms.

FIG. 6 shows a flowchart of a method 600 for transporting tablespaces across platforms. In step 602, a tablespace from a source database is unattached. In step 604, a command is run for converting the on-disk format and/or other format of the tablespace to a target format. The conversion may be performed at the source database system or at the target database system. For example, all data structures may be placed into a target format, except for those data structures that are required to be in a particular platform dependent format for efficient access. In an embodiment, a common format is defined such that it can be attached by all platforms. In this case, the target format of the conversion is the common format.

In an embodiment, the contents of the rows may be platform independent. Additionally, the on-disk structure metadata in the block may be platform specific and stored in a local endian order. In an embodiment, on-disk structure metadata may be converted one block-at-a-time, because block-at-a-time conversion can be performed faster than converting the entire set of blocks of on-disk structure metadata in other manners. In an alternative embodiment, the tablespaces may be converted on a row-by-row basis, as discussed earlier.

In an embodiment, hierarchical conversion macros may be generated in order to describe conversion methods of the blocks. When the convert utility is run, the convert utility looks up the conversion methods that were created by the macros and invokes the conversion. On disk structures may be registered with a database system using the hierarchical conversion macros. The hierarchical conversion macros may automatically generate conversion routines for existing on-disk data structures.

The conversion macros may also be used to generate on disk data structures. The hierarchical conversion macros may define on-disk structures and create conversion routines. The hierarchical conversion macros or the conversion routines created by the hierarchical conversion macros may rearrange data depending on the type of the data. Specifically, macros or routines are defined that specify how to convert each data type. However, it is possible that a first data type, T1, contains a second data type, T2. In such a case, a conversion macro or a conversion routine is defined for converting data type T2. Additionally, a hierarchical conversion macro or a conversion routine is defined for converting data type T1. However, the hierarchical conversion macro or conversion routine for data type T1 does not need to specify how to convert data type T2, but may use the conversion macro or conversion routine for data type T2.

The block-at-a-time or row-by-row conversion can be done dynamically, and therefore a single tablespace (e.g., a read-only table space) may be shared among, and mounted on (e.g., attached), computers of different byte ordering (e.g., big endian and little endian order). Each block or row is converted as it is read and then written in the new common format when the block or row is flushed (e.g., when the block or row is written from the buffer or when an indication is set indicating that the data in the buffer is ready to be written from the buffer in which it was converted to the target database system). For example, the time stamp or other on-disk data structure of the block may be converted as the bock is read and prior to being attached-in. Next, an indication is set that the block may be attached.

Conversion of certain data structures may be performed on-demand. In an embodiment, all the file headers are placed into the same format, so that the files may be identified, facilitating auto-recognition. In an embodiment, a platform identifier, included in the header, may be used for auto-recognition of the platform that the file came from. Consequently, it can be said that the common platform files are "self-aware" of the format from which they originated or are "self-identifying".

In step 606, the tablespace is attached to the target database. The tablespace is now usable at the target database in the common format. Optionally, in step 608, the tablespace may be converted from the common format to another format associated with the target database system.

An Example of a System in which a Tablespace is Transported

Figure 7:
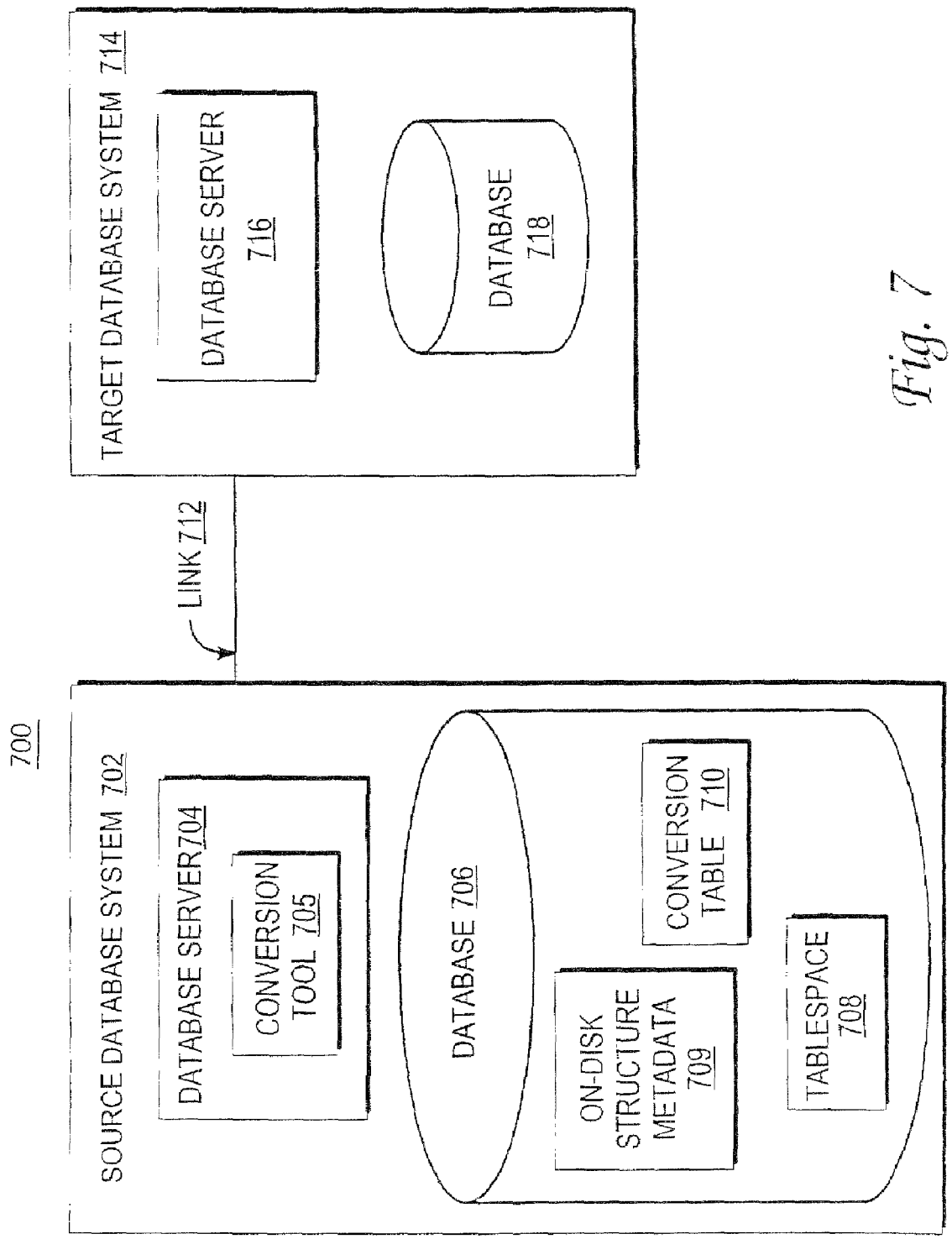
FIG. 7 is an example of a system upon which method shown in FIG. 6 may be performed.

FIG. 7 is an example of a system 700 upon which method 600 may be performed. System 700 includes a source database system 702 having database server 704, which includes conversion tool 705. Source database system 702 also includes database 706 with tablespace 708, which is associated with on-disk structure metadata 709. System 700 may also include a link 712 and a target database system 714 having database server 716 and database 718. Alternative embodiments may not include all of the components listed or may include other components in addition to or instead of those listed above.

Source database system 702 may be a machine or network of machines supporting a source database. The source database system 702 is the source of the tablespace that needs to be transferred.

Database server 704 is the software that accesses the source database. Queries and other database commands are submitted to database server 704, which processes the commands and returns or manipulates data in the source database in response to the database commands. Conversion tool 705 converts the tablespace and on-disk structure metadata associated with the tablespace into the common format.

Database 706 is the source database that contains the tablespace that needs to be transported. Tablespace 708 is the tablespace that needs to be transported.

Target database system 714 is the target database system to which tablespace 708 is transported via link 712 from source database system 702. Database server 716 is the software that accesses the target database. Queries and other database commands are submitted to database server 716, which processes the commands and returns or manipulates data in the target database in response to the database commands. Database server 716 may have a conversion tool instead of or in addition to conversion tool 705. Database 718 is the target database to which tablespace 708 is transferred.

Common On-Disk Data Structures

The common format may include common on-disk data structures that use one common endian order, and one common set of on-disk structure metadata. In converting a system's tablespaces and/or data files to the common on-disk file format, the endian order may need to be modified, and on-disk structure metadata may need to be modified to another machine format, for example. Some types of words or structures may be allocated a different quantity of bits and/or bytes in different formats. Since the on-disk data structures may have different sizes, the offset pointers to on-disk data structures may also be changed.

In an embodiment, the common format includes a common file header. For example, the file header may take up one data block and may be located at an offset having the value zero (indicating the offset from the beginning of the file). A data block may be a group of data (e.g., records) that are transferred together as one unit. In an embodiment, a common format header does not have on-disk structural differences in the file header. The lack of on-disk structural differences in the file header allow different platforms to interpret the differences in the platform attributes.

Backwards Compatibility

In an embodiment, in addition to files from other formats being converted into the common format, the on-disk data structures may also be converted back to any original format without loss of features, functions, or information associated with the format into which the file is being converted. Thus, after converting to the common format, the user may still return to any of the other formats, and use a legacy database that uses the format. As long as all formats can be converted from their original format to the common format and back, backwards compatibility can be maintained. In an embodiment, the user is given a mechanism for choosing whether to maintain backwards compatibility. If the mechanism is set in the target database system to maintain backwards compatibility, the database system cannot introduce any features that will not be able to be converted to the original source on-disk format. In an embodiment, when maintaining compatibility, any operation that can be performed in the common format can also be performed in the original format. Thus, once source database server 112 is transported to target database 124, target database 124 may thereafter be transported back to source platform 116.

Conversion Tool and Process

To perform the file conversion, it may be desirable to specify a mechanism and process for performing the conversion, and to define the objects that need to be operated upon by the mechanism and process while performing the conversion.

Regarding the mechanism, each database may use the same mechanism for performing the conversion (e.g., conversion tool 705). Having each database use the same mechanism simplifies the programming. In an alternative embodiment, different mechanisms for performing the file conversion may be used by different databases. The conversion of the file format may be performed by a stand-alone tool such as conversion tool 705, or may be added as a function or object of another tool. For example, a portion of code for performing the file conversions may be added to a recovery manager or other tool that already includes many of the facilities for performing many of the functions that will be needed to perform the conversions. For example, a conversion tool may use a recovery manager's processes (e.g., Oracle's RMAN) for copying and checking files. Having conversion tool 705 use a recovery manager for copying and checking files allows conversion tool 705 to leverage the parallelism of the recovery manager and the capability of the recovery manager to handle various storage devices.

Regarding the objects that need to be operated upon, a mechanism (e.g., a compile-time service) is included in the conversion tool 705 that declares all convertible on-disk data structures in a manner that conversion logic is automatically derived from the structural declarations of the convertible on-disk data structures. Therefore, all on-disk data structures have their conversion functions generated. Since the structures stored on a particular block of a tablespace are known, the conversion functions associated with the block can be called. The conversion logic is included in the conversion utility.

In an embodiment, the RMAN processes the tablespaces on a row-by-row basis. In an alternative embodiment, the RMAN process the data blocks of tablespaces block-by-block and/or the amount of processing per row is relatively small compared to were all the data in each row platform specific. The RMAN may be configured to convert on-disk data structures while performing the block-by-block or row-by-row processing.

In an embodiment, the conversion process has at least two parts. The first part is adding the common header, if not already present, and the second part is the actual processing of the on-disk data structures. Either of the portions of the conversion process may be performed by the source or target database system. If the conversion is performed at the target database system, it may be desirable for the target database system to include a mechanism for distinguishing the tablespaces and/or data files of foreign systems from a corrupted file, because at the time that the tablespaces and/or data files are received the tablespaces and/or data files may be still in the format of the source database system, which may not necessarily be recognized by the target database system.

One way of facilitating the recognition of files is to tag the file with an identifier of the format that the file is in. Consequently, the conversion tool (e.g., conversion tool 705) may include a portion for tagging the files and a portion for reading the tags to determine which format they are in.

Illustrative Example Using the Conversion Tool

In an embodiment, when transporting tablespace 708 from source database system 702 to target database system 714 using method 600, tablespace 708 is unattached from database 706. Conversion tool 705 converts the on-disk format tablespace 708 into a common format. While or before converting tablespace 708, conversion tool 705 determines which structures in tablespace 708 need to be converted. The conversion to the common format may be performed at either the source database system 702 or the target database system 714 by either conversion tool 705 or by a conversion tool at the target database system.

In an embodiment, on-disk structure metadata 709 is converted one block-at-a-time to the common format, and each block of on-disk structure metadata 709 is converted as it is read in and then written out in the new converted format when it is flushed from source database system 702. There may be no row specific processing necessary. Alternatively, each row may have some data that needs to be converted. Tablespace 708 (with on-disk structure metadata 709) is then attached to database 718.

In an embodiment, cross-platform transportable tablespace is faster than using tools such as Export/Import or Datapump, because the data is copied and converted at the physical level one-block-at-a-time rather than row-at-a-time or because there is relatively little row specific processing necessary. Using cross-platform transportable tablespaces, the user can easily move databases to lower cost platforms. The process of transporting a database to cheaper commodity hardware may be performed without a lengthy downtime using embodiments.

Seed Database

In an embodiment, auto-recognition can be used to create a universal seed database (e.g., a template for a database) that can be used across all platforms, which obviates the need to create a separate seed database for each platform (saving disk space). A seed database may be a logical integration of system data (which is fairly small and can be created by a template) and user data (which can be very large). Thus, when a user wants to create a database, the user is sent a seed database, and the conversion tool uses the information in the seed database to build the platform specific components of the database being built.

Any user data that needs to be sent to the user along with the seed database may be sent in just the on-disk format, without knowledge of any local on-disk format used by the user. The conversion tool uses the auto-recognition to identify what platform the users are using and converts the data files of the template seed database to that platform. In other words, based on the self-identifying nature of the user data the conversion algorithm will be able to convert and integrate the user data into the desired platform format. Without the conversion tool, a different seed database would be needed for each platform. Additionally, without the conversion tool, if the user's platform were unknown, it may at times have been necessary to send the user data in each on-disk format.

After the performance of step 820, processing proceeds to step 830.

An Approach to Converting Metadata

Also in step 230, step 830 of FIG. 8 is performed in an embodiment. In step 830, metadata of source database 114 is converted into a format that would be valid on target platform 126. Source database 114 may store metadata in a variety of structures, such as BFILES, directories, external tables, password files, externally stored objects, backup files, control files, and parameter or configuration files (e.g., spfile and pfile). Source database 114 may store metadata internally (for example, metadata stored in a spfile) or externally (for example, metadata stored in a pfile).

Several embodiments will now be presented for converting metadata into a format that is valid on target platform 126. In one embodiment, when metadata is converted, the metadata is analyzed to determine if any portion of the metadata would become invalid on target platform 126. If it is determined that a portion of the metadata will become invalid on target platform 126, then the metadata is converted to metadata that reflects target platform 126. For example, the name of source database 114 and other identifying features may be stored in a spfile, which is an internally stored file that stores configuration information, in source database 114. The name of source database 114, recorded in the spfile in source database 114, may not be a legal name on the target platform 126; consequently, the name of the source database 114 may be converted to a new name to reflect the naming convention employed by the target platform 126.

Thus, in such an embodiment, when a portion of metadata is identified that would become invalid on target platform 126, a set of rules is consulted. The set of rules may be persistently stored in a variety of locations, such as the database server that is assisting the conversion of the data. The set of rules includes one or more rules for converting data resident on source platform 116 to reflect the target platform 126.

In another embodiment, when a portion of metadata that cannot automatically be converted to reflect target platform 126 is identified, a user may be prompted to supply data values, associated with the metadata, that are valid on the target platform 126. For example, source database 114 may store passwords in a password file. If one or more passwords stored in the password file would become invalid on the target platform 126 (for example, the passwords do not conform to a password convention used by the target platform 126), then a user may be prompted to re-enter passwords that are valid on target platform 126.

In another embodiment, when a portion of metadata that would become invalid on target platform 126 is identified, one or more possible metadata values may be generated and presented to a user. The one or more possible metadata values that are generated are valid on target platform 126, and allow the user to select one of the one or more possible metadata values to use instead of the metadata that would become invalid on target platform 126. In this way, the user may accept or reject any possible metadata value that is generated. If the user does not like any of the suggested metadata values, the user may enter his or her own metadata value to use instead of the portion of metadata that would become invalid on target platform 126.

For example, database 114 may store in a spfile information indicating the block size used by database 114. When that spfile is converted, the block size may be identified as becoming invalid on target database 124, e.g. the block size indicated in the spfile may not be used on the target database 124. Several possible block sizes may be suggested to the user by displaying the suggested block sizes on a screen visible the user. The user could accept or deny the suggestions, or supply a new block size to use, by submitting input to the entity performing the conversion, such as source database server 112.

In yet another embodiment, when a portion of metadata is identified that cannot automatically be converted to reflect target platform 126, the target database 124 may be created without creating any reference to the contents of that portion of metadata. For example, the contents of a redo log file stored on database 114 may not automatically be converted to reflect the target platform 126. However, as explained above, it is not necessary to convert the contents of the redo log files of the source database 114 when copying source database 114 to target database 124. Consequently, the redo log files are identified in source database 114, but the redo log files are not copied to target database 124.

While the redo log files of source database 114 are not copied to target database 124, as explained in further detail below, target database 124 may be created with one or more empty redo log files having sizes that correspond to redo log files on source database 114. In other words, while the contents of redo log files on source database 114 are not copied to redo log files on target database 124, but the size of the redo log files on source database 114 may be used to determine what size to make redo log files in target database 124.

Additionally, metadata may be stored in source database 114 that identifies the location of an externally stored object, e.g., an externally stored table, password file, BFILE, pfile, or backfire. In an embodiment, metadata that identifies the location of an externally stored object may be automatically converted to reflect the target platform 126 such that the metadata, when resident on target platform 126, identifies the externally stored object. For example, source database server 122 may consult a set of rules to determine how to concert metadata, stored on source platform 116, that describes the location of an externally stored table such that the metadata will be valid on target platform 126. In another embodiment, a user may be prompted to supply reference values that are valid on target platform 126 that identify the location of an externally stored object, and the user-supplied reference values are used to convert the metadata to be valid on target platform 126. For example, a user may be prompted for a reference value that identifies an externally stored backup file if source database server 112 cannot automatically convert metadata that identifies the location of the externally stored backup file to a format valid on target platform 126.

In an embodiment, after metadata is converted in step 830, a transport script may be generated by the entity performing the conversion, e.g., source database server 112 or conversion tool 705. A transport script may also be generated during step

820. When the transport script is executed, the target database will be created on the target platform with the converted metadata and converted data.

The conversion of data and metadata, performed in the steps of FIG. 8, may include changing the endian order of the data and metadata. For example, data and metadata stored on source platform 116 may be in a different endian order than that of target platform 126. Each step of FIG. 8 may require that the endian order of data or metadata may changed to reflect the endian order of the target platform 126. If the source platform 116 and the target platform 126 each use the same endian order, then it is not necessary to change the endian order of the data or metadata when performing each step in FIG. 8.

While the functional steps of FIG. 8 have been described above in reference to a specific order for ease of explanation, the functional steps of FIG. 8 may be performed in other embodiments in a different order. For example, step 830 may be performed before or in parallel to step 820 in an embodiment; consequently, the order in which the steps of FIG. 8 are performed may be changed in various embodiments of the invention. As the functional steps of FIG. 8 illustrate the performance of step 230 in an embodiment, after the performance of the steps of FIG. 8 (step 230), processing proceeds to step 240.

Transferring Converted Data and Metadata to Target Platform

In step 240, the data and metadata converted in step 230 are transported from the source platform to the target platform. For example, if step 230 was performed on source database 114 of FIG. 1, then in step 240 the converted data and metadata of source database 114 on source platform 116 are transferred to the target platform 126. In an embodiment, the performance of step 240 may be accomplished using any method that can be used to transfer data from the source platform to the target platform, such as transmission using the file transfer protocol (ftp).

Creating Target Database on Target Platform

In step 250, the target database 124 is created on the target platform 126. The created target database includes the converted data and metadata of the source database 114.

The creation of the target database in step 250 may be performed by executing a script (e.g., the transport script) that creates target database using the data and metadata converted in step 230. In an embodiment, after the creation of target database 124, metadata that identifies the location of externally stored objects is processed to ensure that the metadata is valid on the target platform, i.e., the metadata still correctly identifies the externally stored objects.

When target database 126 is created in step 250, one or more redo log files on target database 126 may be created based on the size of one or more redo log files on source database 114. For example, if source database 114 contained a set of redo long files, each having a particular size, then target database 124 may be created such that target database 124 has the same number of redo log files as source database 114, and the size of redo log files on target database 124 corresponds to the size of redo log files on source database 114.

After the performance of step 250, source database 114 has been transported to the target platform 126. Advantageously, data and metadata stored in database 114 have been copied to target database 124 such that target database 124 contains all the data of source database 114, and target database 124 contains all the metadata necessary to properly interpret the data contained therein. Source database 114 may be transported to target platform 126 without the use of SQL operations to populate data in target database 124. Advantageously, one may transport a database executing on a legacy platform to a newer, low cost platform with ease and efficiency.

Alternate Embodiment wherein Conversion of Data and Metadata Performed on Target Platform As explained above, the conversion of data and metadata performed in step 230 may be performed on the target platform 126. FIG. 2B describes an embodiment wherein the conversion of data and metadata performed in step 230 may be performed on the target platform 126. Steps 210 and 220 of FIG. 2B are the same as described above with reference to FIG. 2B, except that, in FIG. 2B, after the performance of step 220, processing proceeds to step 232.

In step 232, the data and metadata of source database 114 are identified. Thereafter, in step 232, the data and metadata of source database 114 are transferred to the target platform 126. Thus, FIG. 2B differs from FIG. 2A in that data and metadata are transferred unconverted to the target platform 126.

Next, in step 242, the data and metadata transferred to the target platform 126 in step 232 are converted on target platform 126 to a format that is valid on target platform 126. The conversion of the data and metadata in step 242 may be performed by target database server 122, and may be performed similar to that described with reference to FIG. 8. After the data and metadata are converted to a format valid on target platform 126, the target database 124 is created in step 252. Step 252 may be performed by target database server 112 in a manner similar to step 250.

Thus, the conversion of the data and metadata of source database 114 may be performed on either the source platform 116 or the target platform 126.

Implementing Mechanisms

Figure 9:
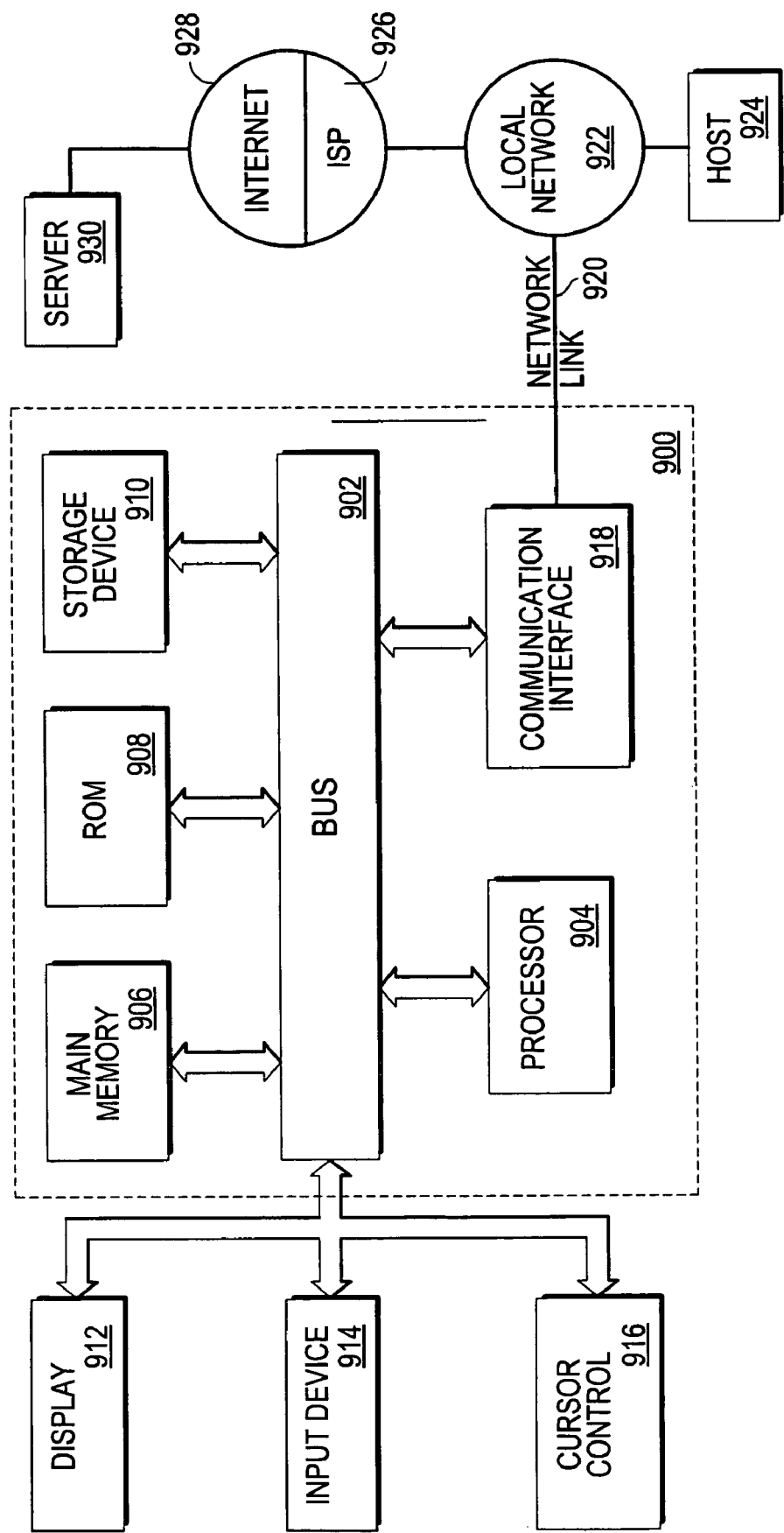
FIG. 9 is a block diagram that illustrates a computer system upon which an embodiment may be implemented.

A database and a database server may each be implemented on a computer system according to an embodiment. FIG. 9 is a block diagram that illustrates a computer system 900 upon which an embodiment may be implemented. Computer system 900 includes a bus 902 or other communication mechanism for communicating information, and a processor 904 coupled with bus 902 for processing information. Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

The invention is related to the use of computer system 900 for implementing the techniques described herein. According to one embodiment of the invention, those techniques are performed by computer system 900 in response to processor 904 executing one or more sequences of one or more instructions contained in main memory 906. Such instructions may be read into main memory 906 from another machine-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 900, various machine-readable media are involved, for example, in providing instructions to processor 904 for execution. Such a medium may take many forms, including but not limited to, non-volatile media, volatile media, and transmission media. Non-volatile media includes, for example, optical or magnetic disks, such as storage device 910. Volatile media includes dynamic memory, such as main memory 906. Transmission media includes coaxial cables, copper wire and fiber optics, including the wires that comprise bus 902. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are exemplary forms of carrier waves transporting the information.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution. In this manner, computer system 900 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-implemented method for creating a target database on a target platform based on a source database on a source platform, comprising the steps of:

identifying, within said source database, first information that cannot be used, in its current state, within the target database;

determining a first subset of said first information;

identifying, within said first information, a second subset that cannot be automatically converted to be valid in the target database, wherein said second subset comprises one or more redo log files on said source platform, the one or more redo log files comprising information for redoing changes made to said source database including one or more change vectors that cannot be automatically converted to be valid in the target database;

opening said source database in a read-only mode to quiesce the contents of said second subset;

automatically converting said first subset to first converted information that is in a state that can be used within the target database;
converting data files of said source database to produce converted files that can be attached to the target database;
creating said target database;
wherein the step of creating the target database includes the steps of
storing in said target database said first converted information,
attaching to said target database said converted files thereby incorporating database objects that reside in said converted files into the target database, and
omitting reference to the contents of said second subset in said target database;
wherein the source and target databases are relational databases managed by one or more database servers that are capable of executing queries against said source and target databases.

2. The method of claim 1, further comprising the steps of:
identifying, within said first information, a third subset that may be automatically converted to be valid in the target database;
in response to identifying said third subset, generating possible data values associated with said third subset that would be valid in said target database on said target platform;
prompting a user to accept or reject said possible data values associated with said third subset;
wherein the step of creating said target database further includes storing in said target database the possible data values accepted by the user.

3. The method of claim 1, wherein said step of creating said target database further comprises the step of:
creating a first set of one or more redo log files on said target database, wherein said first set of one or more redo log files is the same size as said one or more redo log files on said source database.

4. The method of claim 1, wherein said second subset includes undo information on said source platform.

5. The method of claim 4, wherein the step of creating said target database further comprises the steps of:
scanning said source database to locate said undo information in said source database;
modifying said undo information so that said undo information will not be used by said target database.

6. The method of claim 1, wherein said step of creating said target database is initiated on said source platform.

7. The method of claim 1, wherein said step of creating said target database is initiated on said target platform.

8. The method of claim 1, wherein said step of converting data files includes:
prompting a user for supply reference values, valid at said target platform, that identify a location to one or more objects stored externally to said target platform.

9. The method of claim 1, wherein said source platform and said target platform are implemented in the same endian format.

10. The method of claim 1, wherein said source platform and said target platform are implemented in different endian formats.

11. The method of claim 1, further comprising the step of:
after said target database is created on said target platform, receiving, from a user, reference data that establishes a reference from said target database to one or more externally stored objects.

12. The method of claim 1, further comprising the step of:
prior to performing said step of identifying, within said source database, said first information, determining if said source database may be copied to said target platform.

13. A machine-readable storage medium storing one or more sequences of instructions for creating a target database on a target platform based on a source database on a source platform, wherein execution of the one or more sequences of instructions by one or more processors causes the one or more processors to perform the steps of:
identifying, within said source database, first information that cannot be used, in its current state, within the target database;
determining a first subset of said first information;
identifying, within said first information, a second subset that cannot be automatically converted to be valid in the target database, wherein said second subset comprises one or more redo log files on said source platform, the one or more redo log files comprising information for redoing changes made to said source database including one or more change vectors that cannot be automatically converted to be valid in the target database;
opening said source database in a read-only mode to quiesce the contents of said second subset;
automatically converting said first subset to first converted information that is in a state that can be used within the target database;
converting data files of said source database to produce converted files that can be attached to the target database;
creating said target database;
wherein the step of creating the target database includes the steps of
storing in said target database said first converted information,
attaching to said target database said converted files thereby incorporating database objects that reside in said converted files into the target database, and
omitting reference to the contents of said second subset in said target database;
wherein the source and target databases are relational databases managed by one or more database servers that are capable of executing queries against said source and target databases.

14. The machine-readable storage medium of claim 13, wherein execution of the one or more sequences of instructions by the one or more processors causes the one or more processors to perform the steps of:
identifying, within said first information, a third subset that may be automatically converted to be valid in the target database;
in response to identifying said third subset, generating possible data values associated with said third subset that would be valid in said target database on said target platform;
prompting a user to accept or reject said possible data values associated with said third subset;
wherein the step of creating said target database further includes storing in said target database the possible data values accepted by the user.

15. The machine-readable storage medium of claim 13, wherein said step of creating said target database includes the step of:

creating a first set of one or more redo log files on said target database, wherein said first set of one or more redo log files is the same size as said one or more redo log files on said source database.

16. The machine-readable storage medium of claim 13, wherein said second subset includes undo information on said source platform.

17. The machine-readable medium of claim 16, wherein the step of creating said target database includes the steps of:
scanning said source database to locate said undo information in said source database;
modifying said undo information so that said undo information will not be used by said target database.

18. The machine-readable storage medium of claim 13, wherein said step of creating said target database is initiated on said source platform.

19. The machine-readable storage medium of claim 13, wherein said step of creating said target database is initiated on said target platform.

20. The machine-readable storage medium of claim 13, wherein said step of converting data files includes:
prompting a user for supply reference values, valid at said target platform, that identify a location to one or more objects stored externally to said target platform.

21. The machine-readable storage medium of claim 13, wherein said source platform and said target platform are implemented in the same endian format.

22. The machine-readable storage medium of claim 13, wherein said source platform and said target platform are implemented in different endian formats.

23. The machine-readable storage medium of claim 13, wherein execution of the one or more sequences of instructions by the one or more processors causes the one or more processors to perform the steps of:
after said target database is created on said target platform, receiving, from a user, reference data that establishes a reference from said target database to one or more externally stored objects.

24. The machine-readable storage medium of claim 13, wherein execution of the one or more sequences of instructions by the one or more processors causes the one or more processors to perform the steps of:
prior to performing said step of identifying, within said source database, said first information, determining if said source database may be copied to said target platform.

25. The method of claim 1, further comprising the steps of:
identifying, within said first information, a third subset that cannot be automatically converted to be valid in the target database;
in response to identifying said third subset, prompting a user to supply data values, associated with said third subset, that would be valid in the target database.

26. The machine-readable storage medium of claim 13, wherein execution of the one or more sequences of instructions by the one or more processors causes the one or more processors to perform the steps of:
identifying, within said first information, a third subset that cannot be automatically converted to be valid in the target database;
in response to identifying said third subset, prompting a user to supply data values, associated with said third subset, that would be valid in the target database.

* * * * *

UNITED STATES PATENT AND TRADEMARK OFFICE
CERTIFICATE OF CORRECTION

| | | |
|---|---|---|
| PATENT NO. | : 7,571,173 B2 | Page 1 of 1 |
| APPLICATION NO. | : 10/966961 | |
| DATED | : August 4, 2009 | |
| INVENTOR(S) | : Wanli Yang et al. | |

It is certified that error appears in the above-identified patent and that said Letters Patent is hereby corrected as shown below:

In column 3, line 39, after "embodiment" insert -- ; --.

In column 7, line 58, after "number." insert -- For example, undo record 500.100.2 represents the second undo record in undo block 500 when the sequence number of the undo block is 100. --.

In column 7, line 59, before "The set" insert -- A data block is used to store data. FIG. 5 is an illustration of a data block in source database 114 according to an embodiment. When a transaction changes a row in a data block, nthe transaction needs to write a set of information into the data block. --.

In column 16, line 46, delete "backfire." and insert -- backfile. --, therefor.

Signed and Sealed this

Twenty-seventh Day of July, 2010

David J. Kappos
*Director of the United States Patent and Trademark Office*